United States Patent [19]
Thomson

[11] Patent Number: 6,075,818
[45] Date of Patent: *Jun. 13, 2000

[54] VIDEO SIGNAL PROCESSING

[75] Inventor: Rod Thomson, West Sussex, United Kingdom

[73] Assignee: Snell & Wilcox Limited, Hampshire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/935,069

[22] Filed: Sep. 25, 1997

Related U.S. Application Data

[63] Continuation of application No. 08/700,540, Aug. 26, 1996, abandoned.

[30] Foreign Application Priority Data

Mar. 3, 1994 [GB] United Kingdom .................. 9404091

[51] Int. Cl.⁷ ................. H04N 5/14; H04N 9/64
[52] U.S. Cl. ................. 375/240; 348/699; 348/700
[58] Field of Search ................. 348/155, 352, 348/441, 451, 452, 700, 699, 701; 352/129; H04N 5/14, 9/64

[56] References Cited

U.S. PATENT DOCUMENTS

| | | | |
|---|---|---|---|
| 4,510,521 | 4/1985 | Ruprecht et al. ................. | 348/646 |
| 4,924,305 | 5/1990 | Nakagawa et al. ................. | 348/451 |
| 5,027,205 | 6/1991 | Avis et al. ................. | 348/411 |
| 5,083,860 | 1/1992 | Miyatake et al. ................. | 352/129 |
| 5,115,311 | 5/1992 | Jaqua ................. | 348/458 |
| 5,181,111 | 1/1993 | Hedley et al. ................. | 348/452 |
| 5,191,416 | 3/1993 | Dickson et al. ................. | 348/459 |
| 5,208,667 | 5/1993 | Saunders ................. | 348/452 |
| 5,267,034 | 11/1993 | Miyatake et al. ................. | 348/352 |
| 5,276,512 | 1/1994 | Onda ................. | 348/620 |
| 5,291,280 | 3/1994 | Faroudja et al. . | |
| 5,471,239 | 11/1995 | Hill et al. ................. | 348/155 |

FOREIGN PATENT DOCUMENTS 0 472 806   3/1992   European Pat. Off. .

*Primary Examiner*—Howard Britton
*Assistant Examiner*—Nhon T Diep
*Attorney, Agent, or Firm*—Townsend and Townsend and Crew LLP; Kenneth R. Allen

[57] ABSTRACT

Cuts in a video signal are detected by first measuring a correlation parameter between successive images; this can be the sum of the maximum peak heights for each of 16 to 100 or more blocks in a block-based phase correlation procedure. An averaged value of this correlation parameter is maintained and the current measurement of the correlation parameter is compared with the averaged value. The presence of a cut is inferred where the current measurement drops beneath, say, 50% of the average value.

21 Claims, 1 Drawing Sheet

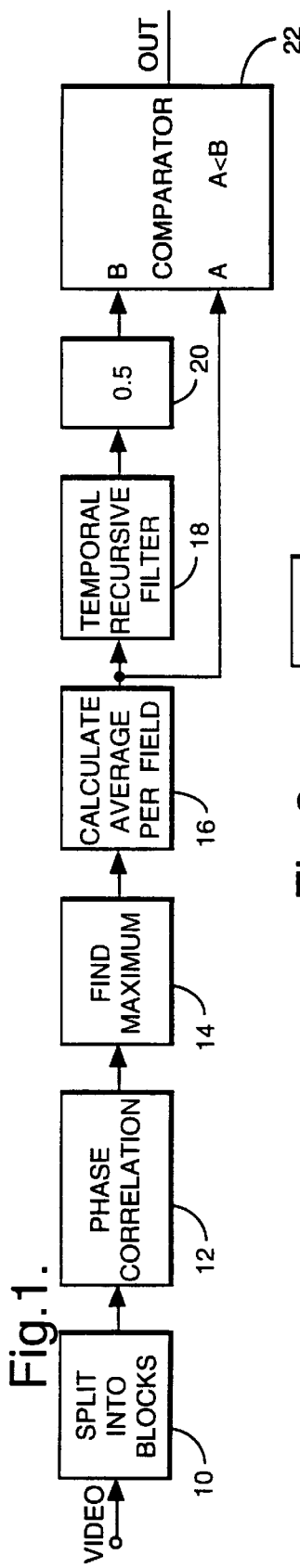
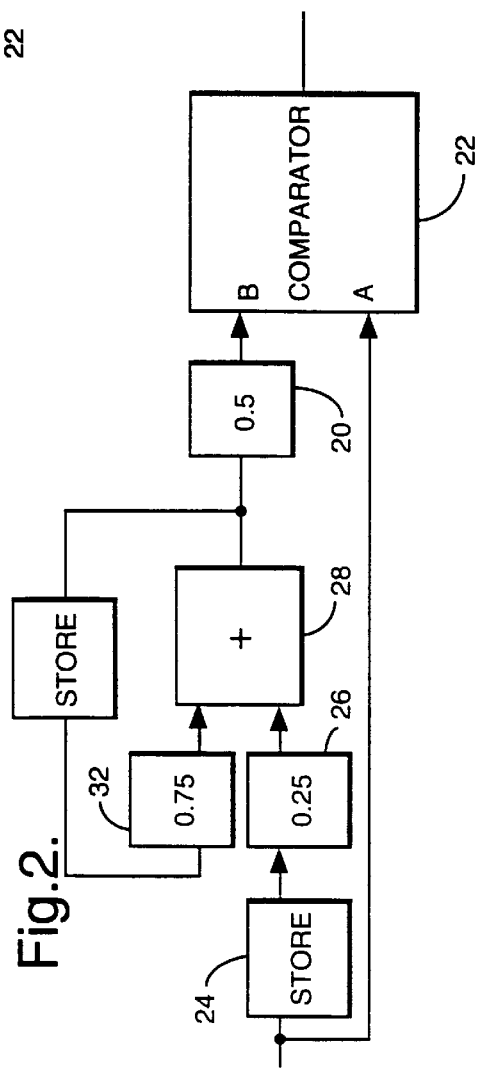
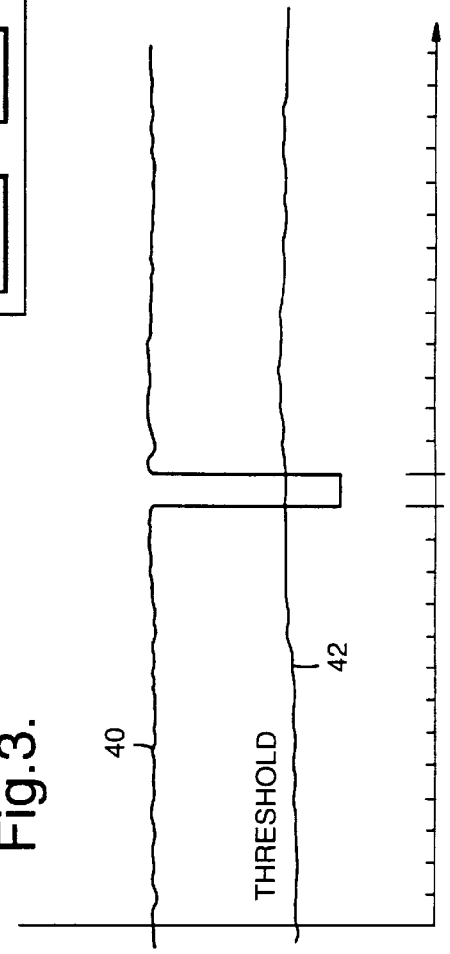

VIDEO SIGNAL PROCESSING

This is a Continuation of application Ser. No. 08/700,540, filed Aug. 26, 1996, now abandoned, the disclosure of which is incorporated by reference.

This invention relates to video signal processing and more particularly to the detection of cuts in a video signal. This information can be used with advantage in a variety of subsequent processing steps such as standards conversion, compression or any other technique which is motion compensated or predictive.

The technique of phase correlation is already well known. In order to identify motion vectors corresponding to the movement of objects or picture components between images, a correlation is performed between the two images in the frequency domain. Peaks in the correlation surface can be identified with probable motion vectors and these can be assigned to the corresponding pixels in a subsequent matching exercise. Reference is directed to GB 2188510, for example.

It has been recognised in the present invention that the technique of phase correlation can be employed in a ingenious manner to provide accurate and reliable detection of cuts.

Accordingly, the present invention consists in one aspect in a method for detecting cuts in a video signal, comprising the steps of measuring a correlation parameter between successive images and comparing the measured correlation parameter with a threshold, the presence of a cut being inferred when the measured correlation parameter passes the threshold.

Advantageously, said correlation parameter is derived from the maximum correlation factor between corresponding blocks in the successive images.

In a further aspect, the present invention consists in a method for detecting cuts in a video signal, comprising the steps of measuring a correlation parameter between successive images; maintaining an averaged value of said correlation parameter; and comparing the current measurement of the correlation parameter with said averaged value, the presence of a cut being inferred where the current measurement passes a predetermined fraction of the averaged value.

Advantageously, said correlation parameter is derived from the maximum correlation factor between corresponding blocks in the successive images.

Suitably, said correlation factor is derived from the sum over a pair of images of the maximum correlation factor from a plurality of corresponding blocks.

In a preferred form of the invention, said averaged value is formed by passing the correlation parameter through a temporal filter, typically a first order recursive filter.

Most conveniently, the correlation parameter will be derived in a phase correlation procedure and the maximum correlation factor will be the highest peak in the phase correlation surface for any particular picture block. This form of the invention will—of course—be of most practical application where the phase correlation hardware has been provided for a different purpose. The invention will then permit the detection of video cuts with very little overhead in terms of hardware cost.

It can be envisaged that, in certain applications, the present invention can be performed using other correlation techniques beyond phase correlation. In the general case, phase correlation will be preferred for the same reasons that phase correlation is preferred in motion estimation. However, there may be application where other correlation hardware is in place and it will be convenient for the present invention to make use of that hardware. One such alternative correlation technique is cross correlation.

The present invention makes the assumption that a cut occurring between any two successive frames will result in a degree of correlation which is very small and, in practical terms, significantly less than the averaged value. Comparing the current correlation measurement with an average value, rather than an arbitrary ceiling, will be expected to result in a detection technique which is sensitive, yet not prone to false positives. It will be recognised that the use of an averaged value for the purposes of comparison, provides a value which is representative of the picture material being handled. For certain picture material, there will generally be a high degree of correlation. A measured value which is not small in absolute terms, but nonetheless much less than the typical value, can than safely be interpreted as a cut. A comparison against a fixed value, would likely fail to detect such a cut. Conversely, in a situation where there is generally a low degree of correlation, a cut will be assumed only where the current measurement is zero, or very close to it. A comparison with a fixed value in such circumstances would be prone to false positives.

In a preferred embodiment, the invention involves splitting the image into blocks—typically 100 but perhaps as low as 16—and performing a phase correlation between the same blocks in successive images. The highest motion peak is detected in each phase correlation surface that is produced. The average highest peak is calculated by adding together the heights of the highest peaks in each of the phase correlation surfaces produced between the images. This results in a value A.

In a time averaging procedure, the value A is then applied to a recursive temporal filter to produce a value F. During each field interval, a cut is detected by checking if A is less than a chosen factor of F. The chosen factor might be 50% or 20%.

The invention will now be described by way of example with reference to incoming drawings in which:

FIG. 1 is a block diagram illustrating apparatus according to the present invention;

FIG. 2 is a block diagram illustrating certain components of FIG. 1, with increased detail and;

FIG. 3 is a plot illustrating the results of measurement and comparative steps according to the present invention.

Referring initially to FIG. 1, a video signal is divided in unit 10 into a number of separate blocks. For the purposes of the present invention, the number of blocks is not critical although a very small number of blocks, perhaps lower than about 16, might reduce the reliability of the method. Phase correlation unit 12 then conducts a phase correlation process for each of the blocks, over successive images. Maximum unit 14 derives the value of the maximum peak for each block. In contrast with the previously known use of phase correlation in motion estimation, the location of the maximum or highest peak in the phase correlation surface is not of interest, merely the amplitude of that peak. The average of the highest peaks for the respective blocks is then calculated in average unit 16 to provide an average for the field. This average value is passed directly to input A of a comparator 22 and indirectly to comparator input B through a temporal recursive filter 18 and multiplier 20 which serves to ÷2. The comparator 22 provides a "cut" output signal when the current correlation parameter at input A falls beneath the threshold set out at input B.

Turning to FIG. 3, there is shown at 40 the instantaneous value of the measured correlation parameter for successive fields. The threshold value shown at 42 is one half of the time-averaged value. It will be seen that at a cut, indicated generally at 44, the value of the correlation parameter for the two fields either side of the cut drops significantly and falls beneath the threshold.

A suitable arrangement for the temporal recursive filter is shown in FIG. 3 which, for convenience, also includes the multiplier 20 and the comparator 22. It will be seen that the output of the average unit 16 passes to input A of comparator 22 and also to a store 24 providing a one field delay. The output of store 24 is taken to adder 28 through a multiplier 26 performing a ×0.25 operation. The output of the adder 28 is taken in a feedback loop through a further store 30 providing a field delay and a multiplier 32 performing a ×0.75 operation.

It will be recognised that this arrangement provides a temporal recursive filter having a 25% weighting for the current value. The presence of the store 24 ensures that the current value is compared in comparator 22 with the time-averaged signal up to and including the previous field.

It will be understood that the specific arrangements have been described by way of example only and a wide variety of alternative approaches can be adopted.

What is claimed is:

1. A method for detecting cuts in a video signal, comprising:

performing a motion correlation process between successive images in the video signal and deriving therefrom a correlation parameter;

forming a time sequence of a plurality of correlation parameters;

filtering said time sequence to produce a threshold value; and comparing an instantaneous correlation parameter with said threshold value; and inferring presence of a cut in the video signal when the instantaneous correlation parameter passes the threshold value.

2. A method according to claim 1, wherein said correlation parameter is derived from a block based correlation between successive images.

3. A method according to claim 2, wherein said correlation parameter is derived from a maximum correlation factor between corresponding blocks in successive images.

4. A method according to claim 2, wherein the correlation parameter is derived in a phase correlation procedure.

5. A method according to claim 3, wherein the correlation parameter is derived in a phase correlation procedure.

6. A method according to claim 1, wherein said sequence of correlation parameters is passed through a temporal filter.

7. A method according to claim 6, wherein said temporal filter is a first order recursive filter.

8. A method according to claim 6, wherein the correlation parameter is derived in a phase correlation procedure.

9. A method according to claim 1, wherein the correlation parameter is derived in a phase correlation procedure.

10. A method according to claim 9, wherein a maximum correlation factor is derived as a highest peak in a phase correlation surface for a particular block.

11. A method according to claim 1, wherein said filtering comprises maintaining an averaged value of said correlation parameter.

12. A method according to claim 11, wherein the threshold value is a predetermined fraction of the averaged value.

13. A method according to claim 11, wherein the correlation parameter is derived in a phase correlation procedure.

14. A method according to claim 11, wherein said correlation parameter is derived from a maximum correlation factor between corresponding blocks in successive images.

15. A method according to claim 14, wherein the correlation parameter is derived in a phase correlation procedure.

16. A method according to claim 14, wherein an averaged value is formed by passing the correlation parameter through a temporal filter.

17. A method according to claim 16, wherein said temporal filter is a first order recursive filter.

18. A method according to claim 14, wherein said correlation parameter is derived from a sum over a pair of images of the maximum correlation factor from a plurality of corresponding blocks.

19. A method according to claim 18, wherein the correlation parameter is derived in a phase correlation procedure.

20. A method according to claim 18, wherein an averaged value is formed by passing the correlation parameter through a temporal filter.

21. A method according to claim 20, wherein said temporal filter is a first order recursive filter.

* * * * *

UNITED STATES PATENT AND TRADEMARK OFFICE
CERTIFICATE OF CORRECTION

PATENT NO.    : 6,075,818
DATED         : June 13, 2000
INVENTOR(S)   : Rod Thomsom Page 1 of 1

It is certified that error appears in the above-identified patent and that said Letters Patent is hereby corrected as shown below:

Column 1,
[30] Foreing Application Priority Data insert
--March 3, 1995 WIPO PCT/GB95/00457--.

Signed and Sealed this

Seventeenth Day of July, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,075,818
DATED : June 13, 2000
INVENTOR(S) : Rod Thomson

It is certified that error appears in the above-identified patent and that said Letters Patent is hereby corrected as shown below:

Column 1,
Item [30], Foreign Application Priority Data, insert -- March 3, 1995 WIPO PCT/GB95/00457 --.

Signed and Sealed this

Sixteenth Day of April, 2002

Attest:

JAMES E. ROGAN
*Attesting Officer*     *Director of the United States Patent and Trademark Office*